United States Patent [19]

Chapin et al.

[11] Patent Number: 5,155,788
[45] Date of Patent: Oct. 13, 1992

[54] OPTICAL FIBER DISPOSED IN AND DECOUPLED FROM A REINFORCING MEMBER

[75] Inventors: J. Thomas Chapin, Alpharetta; Carl R. Taylor, Lawrenceville, both of Ga.; Peter A. Woog, Phoenix, Ariz.

[73] Assignee: American Telephone & Telegraph Company, New York, N.Y.

[21] Appl. No.: 575,059

[22] Filed: Aug. 29, 1990

[51] Int. Cl.[5] .................................................. G02B 6/44
[52] U.S. Cl. ................................... 385/104; 244/3.16; 385/102; 385/128
[58] Field of Search ............... 350/96.23, 96.29, 96.30, 350/96.33, 96.34; 385/100, 102, 104, 123, 126–128, 147; 244/3.12, 3.16

[56] References Cited

U.S. PATENT DOCUMENTS

| | | | |
|---|---|---|---|
| 4,239,335 | 12/1980 | Stiles | 350/96.23 |
| 4,349,243 | 9/1982 | Amano et al. | 350/96.23 |
| 4,359,598 | 11/1982 | Dey et al. | 350/96.23 X |
| 4,365,865 | 12/1982 | Stiles | 350/96.23 |
| 4,422,718 | 12/1983 | Nakagome et al. | 350/96.23 |
| 4,460,419 | 7/1984 | Parfree et al. | 156/56 |
| 4,577,925 | 3/1986 | Winter et al. | 350/96.23 |
| 4,701,016 | 10/1987 | Gartside et al. | 350/96.23 |
| 4,768,858 | 9/1988 | Hussein | 350/96.32 |
| 4,915,490 | 4/1990 | Ramsay et al. | 350/96.23 X |
| 4,950,049 | 8/1990 | Darsey et al. | 350/96.30 |
| 4,955,688 | 9/1990 | Chapin et al. | 350/96.23 X |
| 4,957,344 | 9/1990 | Chesler et al. | 350/96.23 |

FOREIGN PATENT DOCUMENTS 3538664 5/1987 Fed. Rep. of Germany ... 350/96.23

OTHER PUBLICATIONS

Comline Japan Daily: Telecommunications, Jul. 10, 1990.
Brochure, Air Logistics Corp.
Air Logistics Technical Bulletin No. 56, Jun. 1982, FIG. 1.

Primary Examiner—John D. Lee

[57] ABSTRACT

A sheathed optical fiber (15) which may be used in a package (20) in guidance systems for tethered vehicles includes a carrier (21) on which are wrapped a plurality of convolutions of the sheathed optical fiber. The sheathed optical fiber in a preferred embodiment includes a metallic tubular member (40) with optical fiber (30) being disposed in a longitudinally extending passageway (42) of the tubular member and secured therein against unintended lateral disassociation with the tubular member in a manner which minimize microbending losses. The reinforced optical fiber has mechanical ruggedness and tensile load capability which render it ideal for use in tethered vehicles.

20 Claims, 4 Drawing Sheets

OPTICAL FIBER DISPOSED IN AND DECOUPLED FROM A REINFORCING MEMBER

TECHNICAL FIELD

This invention relates to a sheathed optical fiber. More particularly, this invention relates to optical fiber which is encased at least partially in a metallic sheath.

BACKGROUND OF THE INVENTION

After only a somewhat recent introduction, optical fiber has had a meteoric rise as the predominant means of transmission media in voice and data communications. Optical fiber is manufactured by drawing the fiber from a preform which is made by any of several well known processes. Afterwards, or as part of a tandem process, the drawn fiber is coated, cured, measured and taken up, desirably in an automatic takeup apparatus, on a spool to provide a package. Typically, an optical fiber has a diameter on the order of 125 microns, for example, and is covered with a coating material which increases the outer diameter of the coated fiber to about 250 microns, for example.

A package of optical fiber is used in operations such as ribboning, cabling, and rewinding and is used to ship optical fiber to other companies which further process the fiber. The optical fiber typically is used in voice and data communications systems, both commercial and military. Optical fiber may be used in weapons systems in which it is used for guidance and for data communications. Such uses include communications between aircraft, between an aircraft and a ship, and between a projectile, such as a missile or torpedo, and a control station at a launch site, for example. Optical fiber provides the advantages of increased data bandwidth, reduced weight and greater range than wire-guided systems of the prior art.

One optical fiber application in a weapons system involves the packaging of a continuous length of optical fiber on a bobbin which is positioned inside a vehicle such as a torpedo, for example. Such a vehicle commonly is referred to as a tethered vehicle. One end of the fiber is attached to operational devices in the vehicle, whereas the other end of the fiber is connected to a control or communications station at a launch site. During and after launch, two-way communication with the vehicle is conducted.

There are, however, certain disadvantages, not present in other forms of communication, in using optical fiber for guiding tethered vehicles. Optical fiber is less robust than metallic conductors, rendering it subject to breakage. Aside from breakage, optical fiber communication performance may be degraded by microbends in the fiber which are generated by bending or by other stresses to which the fiber may be subjected. Such damage to an optical fiber not only reduces the long-term durability of the fiber, but also causes losses in the strength and in the content of the optical signal. Likewise, physical or optical integrity may be affected adversely by any sharp bends which are experienced as the fiber pays out from its packaged configuration.

In order to use such an arrangement for a tethered vehicle, there must be provided a reliable and compact package of the optical fiber which may be disposed within the vehicle and which will permit reliable deployment of the optical fiber during the flight of the vehicle. The use of metallic conductors for guidance or control of launched vehicles is known. Although the art teaches the use of bobbins on which a metallic conductor is wound, the fragility of optical fiber requires specialized treatment that facilitates the unwinding of the optical fiber from its bobbin at a relatively high rate of speed.

Another problem in the optical fiber guidance of tethered vehicles relates to the successful unwinding of the fiber from a bobbin as the bobbin is propelled along with the vehicle. In optical fiber packages for use in tethered vehicles, as many as at least thirty layers of optical fiber are wound on a guiding structure. The leading end of the optical fiber is connected to a guidance system for controlling the path of travel of the vehicle. It becomes important for the optical fiber to be payed off from the bobbin without the occurrence of snags, or tight bends, otherwise the fiber may break or the signal may be attenuated and the control system rendered inoperable. Contributing to the successful payout of the optical fiber is a precision wound package. Not only must the convolutions be wound with precision, they also must remain in place as wound during handling and during deployment. In other words, the optical fiber package must be a highly stable one.

During storage and transport of the bobbin, mechanical stability is most important to the integrity to the wound package, thereby maintaining the package in a ready condition for deployment. During deployment, both mechanical and optical effects are significant. The package must permit a helical pattern of payout at potentially high speeds, possibly approaching or exceeding Mach 1. Also, microbending in the layers of undeployed fiber on the bobbin during deployment can affect adversely optical performance.

The foregoing problems are exacerbated when optical fiber is contemplated for tethered submersibles such as tethered torpedos. Optical fiber in such uses is destined to experience significant tension, given the travel in a liquid instead of in air. Further, the optical fiber undergoes a high degree of environmental abuse because of its passage most likely through strong currents and through surfs. Presently, such tethered vehicles are guided by metallic conductors which extend from the torpedo to the launching body.

What is needed and what has not been available in the prior art is a sheathed optical fiber which is robust and includes suitable mechanical protection for the optical fiber thereof. Further what is sought is a bobbin of precision wound optical fiber in which the convolutions of fiber are held together in a stable package that permits payout at relatively high speeds in an underwater environment.

SUMMARY OF THE INVENTION

The foregoing problems have been overcome with a sheathed optical fiber of this invention. A sheathed optical fiber includes a length of optical fiber and a metallic reinforcing member in which the fiber is disposed. The metallic reinforcing member includes a longitudinally extending passageway in which the fiber is secured against unintended lateral disassociation with the metallic reinforcing member. Also the passageway configuration in relation to the optical fiber disposed therein and the securement of the fiber in the metallic reinforcing member are such as to minimize microbending losses.

In one embodiment, optical fiber is caused to be disposed within a tube which is made of a metallic material. Alternatively, a longitudinally extending metallic member may be formed with a longitudinally extending slot. Optical fiber is caused to become disposed in the slot and secured therein.

An optical fiber package of this invention includes a plurality of convolutions which may be wound in a plurality of individually sheathed layers on a bobbin such that at least a portion of each convolution is adjacent to at least a portion of another convolution. The package is relatively stable with respect to time over a relatively wide temperature range at payout speeds which may be at least as high as about 300 meters per second. As a result, the optical fiber reliably may be payed out within a short period of time or much later and at substantially varying temperature.

For the package, a layer of an adhesive material encloses the outer surface of the metallic reinforcing member which along at least a portion of the outer surface which is to adhere to a portion of an outer surface of an adjacent convolution is adapted upon suitable treatment to bond molecularly access an interface with another portion of the adhesive material which has been applied to the adjacent surface. To bond molecularly is intended to mean the joining of contiguous faces of adjacent surfaces along an interface therebetween through chain or material interpenetration which does not involve chemical bonding or material interpenetration that may occur with chemical bonding or any other form of coupling that can result in an attractive force between the two surfaces. Chemical or other forms of bonding that could result in adhesion between layers may be used. Further, because adhesion between metallic surfaces is desired, it may be necessary first to treat the metallic surfaces with a coupling agent, for example. Other portions of the outer surfaces outside bonded regions are characterized by a relatively low coefficient of friction.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
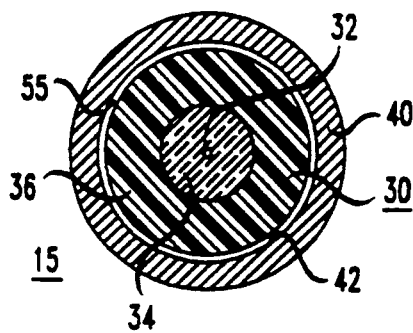
FIG. 1 is an end view of a sheathed optical fiber which may be wound in a plurality of layers of convolutions on a package.
Figure 2:
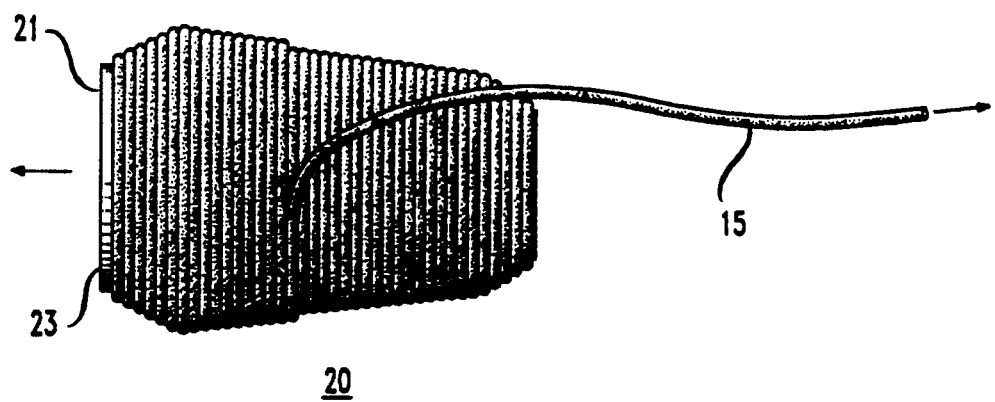
FIG. 2 is a schematic view of payout of a precision wound reinforced optical fiber package of this invention.

Referring now to FIG. 1, there is shown a reinforced or sheathed optical fiber 15 which may be used, for example, in an optical fiber package which is designated generally by the numeral 20 (see FIG. 2). The package 20 includes a carrier or bobbin 21 which includes a single flange 23. The bobbin 21 is adapted to allow sheathed optical fiber 15 to pay out from an end of the bobbin opposite to the flanged end.

The package 20 may include a plurality of layers each comprising a plurality of convolutions of an elongated member which includes a reinforced optical transmitting medium. Such a medium may be an optical fiber 30 which comprises a core 32 (see FIG. 1), a cladding 34 and a coating 36 or multiple coatings. Typically, the outer diameter of the coated optical fiber is 250 $\mu$m. The term optical transmitting medium is intended to designate optical fiber with single or multiple protective coatings and possibly buffer layering thereon.

The reinforced optical fiber of this invention comprises the optical fiber 30 encased or at least partially encased in a metallic reinforcing member. In a preferred embodiment, the metallic member comprises a metallic tubular member 40 (see FIG. 1) having a longitudinally extending passageway 42. The passageway has a cross sectional area which is sufficient to allow the coated optical fiber to be disposed therein. Also in a preferred embodiment, the tubular member is made of a corrosion resistant material such as stainless steel. The foregoing arrangement may be manufactured by causing a metallic tape to be wrapped about an advancing optical fiber to form a butt seam. Afterwards, the butt seam may be joined and polished.

Figure 3:
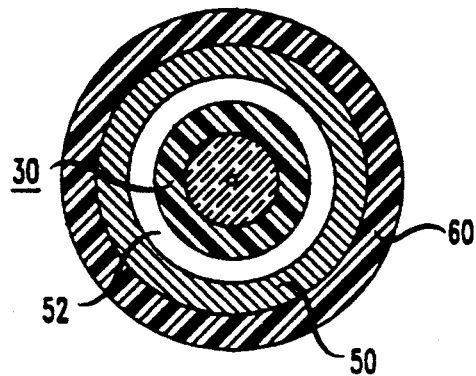
FIG. 3 is an enlarged end cross sectional view of an alternate embodiment of a sheathed optical fiber.

Another embodiment of the sheathed optical fiber shown in FIG. 1 is shown in FIG. 3. As shown in FIG. 3, a loose tube approach may be used in which optical fiber 30 is disposed loosely within a metallic tube 50, that is, the metallic tube is sized so that there is a substantial difference between the outer diameter of the coated optical fiber and the inner diameter of the metal tube. In such a structure, a void 52 between the optical fiber and the metallic tube may be unfilled or may be filled with a grease-like material such as that disclosed in U.S. Pat. No. 4,701,016 which issued on Oct. 23, 1988 in the names of C. H. Gartside, III, et al. On the other hand, the void may be filled with crosslinked silicone or polyurethane, or a highly oil extended block copolymer such as Flexgel® compound, for example, or a hot melt material or a thermoplastic material. What is important is that the optical fiber is decoupled from the metallic tube 50 so that amplitude variations of the optical fiber do not engage the tube wall, thereby minimizing microbending losses.

The class of sheathed optical fibers falling generally under that shown in FIG. 1 is considered to be a tightly buffered optical fiber. In it, the difference between the inner diameter of the metallic tube 40 and the outer diameter of the coated optical fiber 30 is relatively small. In order to prevent amplitude variations of the optical fiber from engaging the wall of the reinforcing tube 40 and thereby cause microbending losses, a void 55 of the structure in FIG. 1 is filled with a somewhat stiff material such as Hytrel polyether polyester material having a relatively low glass transition temperature, $T_g$. Hytrel polyether polyester plastic material has a modulus of about $2.8 \times 10^8$ to $1.03 \times 10^9$ dynes/cm$^2$ on the high temperature end of its modulus behavior curve and a modulus of about $2.8 \times 10^9$ to $3.5 \times 10^9$ dynes/cm$^2$ on the low temperature end. Other materials for filling the void include suitable thermoplastic materials, either amorphous or semi-crystalline, reactive polyurethanes, thermoset materials, which include epoxies, silicones and hot melt materials. For purposes of clarity, the filling material in the annular void 55 is not shown.

What is important for any material used to fill the voids 52 or 55 in the embodiments of FIGS. 3 or 1, respectively, is that it does not include a solvent, inasmuch as the material is fully enclosed laterally and evaporation of the solvent could not occur.

In the manufacture of the sheathed optical fiber, as the optical fiber is advanced into juxtaposition with a metallic tape, the tape is provided with one of the suitable materials which upon being wrapped about the fiber is caused fill the void between the optical fiber and the metallic tube which is formed from the tape. Such a material prevents undesired relative longitudinal motion between the fiber and the metallic tubular member 40.

In another embodiment, an optical fiber to which an adhesive material has been applied and dried such as that disclosed in appl. Ser. No. 07/316,615 which was filed on Feb. 28, 1989 (U.S. Pat. No. 4,950,049) and which is incorporated by reference hereinto may be used. Then as a billet of metallic material is drawn down about the optical fiber or as a tape of metallic material is wrapped about an advancing optical fiber, heat energy generated by such operations causes the preapplied adhesive material to melt and upon cooling to secure the optical fiber within the tubular member.

It should also be pointed out that particularly for the embodiment shown in FIG. 1, the optical fiber may be provided with a primary coating which is substantially greater in thickness than is typical. It will be recalled that typical coated optical fiber has an outer diameter of 250 μm with the uncoated optical fiber having a diameter of 125 μm. The coated optical fiber of this invention may have an outer diameter of 500 μm with the outer diameter of an inner primary coating layer being in the range of about 225-260 μm. Inasmuch as the primary coating material has a lower modulus than that of the secondary, the optical fiber may perturbate within the primary coating without the danger of engaging the tubular member 40.

Such an optical fiber is advantageous for use with the sheathed optical fiber of this invention. It is more robust and may be easier to draw metal of the sheath around it. With the additional thickness of the less rigid primary coating layer, the glassy optical fiber is more resistant to microbending loss which may ensue from amplitude variations that engage a relatively rigid surface such as the wall of the metallic member.

It is important to keep in mind several concerns that are sought to be addressed when the sheathed optical fiber 15 is used for a package 20. First, there is the physical concern of how the sheathed optical fiber behaves as it is peeled off the bobbin at high speed. On the payout side, the pull force must be acceptable. Of concern is the ease with which the enclosing metallic material is unwound. Also, of concern is how the peel force changes with respect to increased speed as more of the sheathed optical fiber is payed out. The payout must be acceptable over a range of temperatures and over a range of speeds. In short, what is desired is substantially constant payout behavior at any of a wide range of operating temperatures and speeds.

Another physical concern is the stability of the package. The package may be stored for a number of years and be subjected to vibration, temperature and humidity changes. It is desired that the package remain organized during this period. The adhesive should inhibit reorganization of the package in what are known as "slumps", where fibers in one layer move between fibers in adjacent layers.

Secondly, optical performance of the wound optical fiber must be optimized. Forces are generated because the optical fiber is under tension. Pressure between adjacent convolutions of the optical fiber and any surface roughness thereon must be avoided. Should the convolutions be rough, microbending occurs. In order to maintain low loss, a smooth, uniform surface is needed to minimize perturbations in the lateral force against the coated optical fiber and thereby minimize attenuation. This of course is accomplished by reinforcing the fiber with a metallic material whereupon the engagement of adjacent convolutions includes the engagement of metal with metal.

Any number of adhesive materials may be applied as a layer 60 (see FIG. 3) to an external surface of the metallic reinforcing member which encloses the optical fiber to provide a stable package. For example, a thermoplastic material, either amorphous or semi-crystalline, a hot melt material, a thermosetting material, or a wax or other materials including metallic or ceramic bonding materials that can form interfacial bonding by heat treatment or by time or solvent exposure may be used.

What is important is that the adhesive material must meet particular requirements. It must be capable of being applied to the metallic member 40 or 50 preferably in a liquid state and then caused to be tack-free when it is wound on a process spool. Also, the adhesive material must be capable of being treated subsequently so that it develops adhesive bonds between at least portions of adjacent convolutions of the sheathed optical fiber which are wound on a carrier bobbin. The bonding must be such not only that the resulting optical fiber package is stable, but also, it must allow the optical fiber convolutions to be payed off from a carrier spool without damage to the fiber.

The modulus and the viscoelastic behavior of the adhesive material over a relatively wide operating temperature range are important. The adhesive material contributes to the performance from both the optical and the physical points of view.

The modulus of the adhesive material is important for both physical and optical reasons. From a physical standpoint, the adhesive material must have a sufficiently high modulus such that the package is stable from the outset and after a significant storage time. If the modulus is too low, stabilization properties are not acceptable; if too high there is excessive loss or fiber breakage could occur during payout. The adhesive material is such that the packaged optical fiber exhibits suitable optical performance which is not compromised by the modulus of the adhesive material.

Figure 4:
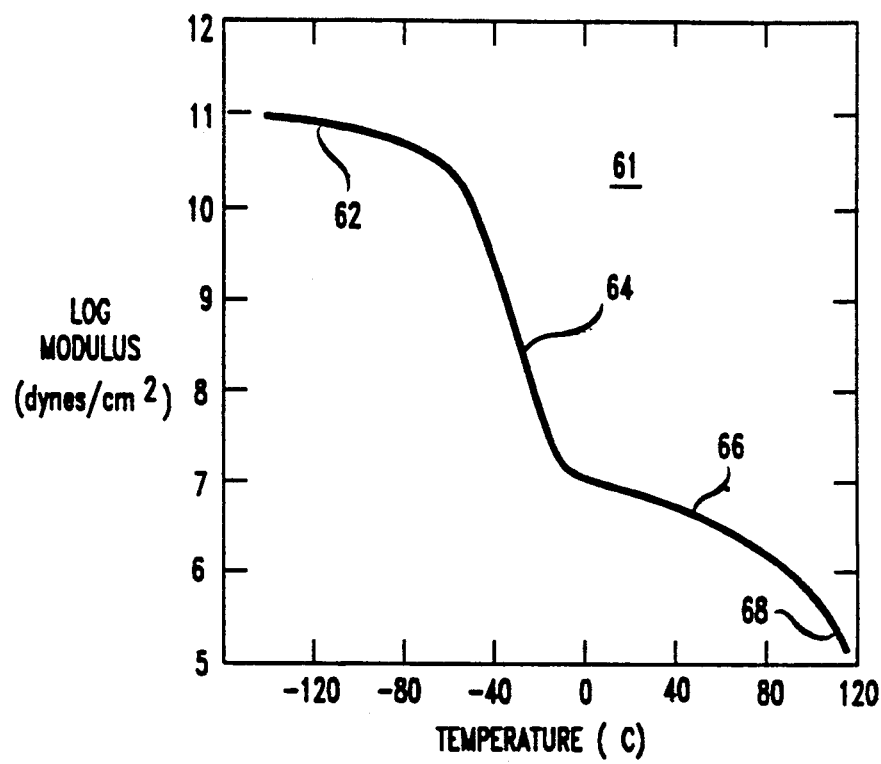
FIG. 4 is a curve which depicts a plot of the logarithm of modulus versus temperature for a typical polymeric material.

Referring now to FIG. 4, there is shown a curve 61 which depicts the modulus behavior of a thermoplastic material. The modulus of a polymeric material is time and temperature dependent. FIG. 4 illustrates schematically the general behavior of the modulus of a material as a function of temperatures. The material is in a glassy state if it is in a zone which is designated generally by the numeral 62. At that time, it is non-tacky and the modulus is high (on the order of about $10^{11}$ dynes/cm$^2$) and substantially constant. Then, as the temperature increases, the modulus decreases, descends through a transition zone 64 and subsequently becomes rubbery along portions 66 and 68. The knee in the curve defines a parameter referred to as glass transition temperature, $T_g$. The glass transition temperature, $T_g$, of a material is the temperature, determined for instance, by means of stress/strain measurement, at which the modulus of the material changes from a relatively high value occurring in the lower temperature, glassy state of the material to the lower value occurring in the transition region to the higher temperature, elastomeric state of the material. In FIG. 4, the $T_g$ separates in a transition region 64 the glassy region 62 from a region 66 in which the modulus is low (e.g. on order of about $10^6$ dynes/cm$^2$) and substantially constant and which is the elastomeric region of the polymer.

The degree of tack depends on the length of time during which the thermoplastic material is exposed to elevated temperatures and the values of these temperatures. Bonding, when thermoplastic materials are used, is enhanced by causing the composite material to be heated in the range shown for these portions 64, 66, or 68 of the graph, depending on the amount of bonding which is desired. For some materials, bonding in the transition zone may be sufficient. For a thermoplastic material, molecular bonding occurs following the interpenetration or migration of chains of which the plastic material is comprised across interfacial boundaries between contiguous portions of the adhesive material on adjacent convolutions.

The amount of bonding is related to the amount of chain penetration that occurs across the contiguous portions of the convolutions. Also, the amount of bonding increases for increasing temperatures to which the adhesive material is exposed or to increasing time during which it is exposed at a given temperature. Increased bonding occurs as the temperature passes through the regions 64, 66 and 68. The required amount of bonding for a particular application will determine the time or temperature or both to which the sheathed optical fiber is exposed.

Because of the bonding or molecular migration, as it is often termed, across the interfaces, the convolutions of the sheated optical fiber are held together. When subjected to treating, the adhesive material on contiguous portions of the adjacent convolutions on the bobbin begin to develop molecular bonds across the interface. After exposure to a predetermined temperature for a predetermined time, sufficient molecular bonding across the interface is established to hold together the convolutions. As a result, a stable package of sheathed wound fiber is provided. It may be handled with confidence so that the convolutions will remain in place. However, the bond is not so great as to impede payoff of the sheathed optical fiber from the bobbin. At the expected tension levels, each successive convolution separates from adjacent convolutions without any damage to the optical fiber occurring. It must be recognized that it is only at the contact points between adjacent convolutions that molecular migration occurs to establish bridging chains across the interface.

What is important is that suitable adhesion can be caused to occur with any adhesive material for which molecular bonding can occur across an interface between contiguous portions of adjacent convolutions as a result of suitable treatment. Such materials include a thermosetting material, and a hot melt adhesive material or a thermoplastic material, either amorphous or semi-crystalline. During suitable treatment of any of these materials, molecular migration across the interfaces between contiguous portions occurs. Upon cooling, a molecular bond is established across that interface to hold the convolutions securely in place.

For a thermoplastic material, for example, at the interface between adjacent convolutions, the transition of the thermoplastic material as shown in FIG. 4 is reversible. As the adhesive material cools, the region of bonding along contiguous portions of adjacent convolutions is immobilized or frozen in and is stable with time. When the sheathed optical fiber is cooled to ambient temperatures, the interfacial bonding is preserved at levels achieved during the higher temperature exposure. Those portions of the surfaces which are not bonded return to a glassy state, as can be seen from FIG. 4. The use of a glassy, adhesive material which is tack-free at room temperature facilitates high speed winding of convolutions thereof on a bobbin and the payout therefrom. The adhesion is generated and controlled by the tacking of the thermoplastic material in the transition and/or rubbery zones.

The return of those quadrants of the adhesive material on the sheathed optical fiber which are not contiguous to portions of adhesive material on adjacent convolutions to a glassy state upon cooling is beneficial. These surfaces are characterized by a relatively low coefficient of friction. These low coefficient of friction surfaces facilitate the high speed payout of the optical fiber. If the surfaces were not so characterized, payout, which involves portions of each convolution sliding over a portion of a surface of other convolutions, may cause some of the adjacent convolutions to become dislodged prematurely and cause package disruption. This undesired occurrence may become manifested in the payout of multiple convolutions which could lead to entanglements. This is especially likely to happen when those convolutions adjacent to the flange 23 of the bobbin 21 are payed out in a direction generally parallel to a longitudinal axis of the bobbin and toward an unflanged end thereof. Advantageously, the low coefficient of friction portions of the surfaces of the convolution which are not bonded molecularly avoids multiple payout with each convolution being pulled easily over surfaces of other convolutions.

Normally, and as should be evident from FIG. 4, many polymeric materials are not stable with respect to time and temperature. For the package 20, stability throughout a time and temperature range is what is needed.

Between $-32°$ C. and $60°$ C., which is an expected launch temperature range for use in the package 20, the adhesive material must insure stable payout. If the adhesive constituent had a $T_g$ which fell within the launch window, the material could be too stiff or too weak in part of the operational temperature range. What is desired is that the material of the coating layer 60 has a modulus behavior within the launch window which is relatively stable with respect to payout speeds and temperatures which may be at least as high as about 300 meters per second. Also, the adhesive material must be relatively stable over the storage lifetime of the package so that its behavior during payout does not change.

In the preferred embodiment, the adhesive material is a polyvinyl butyral. The bath in an applicator (not shown) comprises a mixture comprising polyvinyl butyral and a solvent. In the preferred embodiment, the solvent is methyl ethyl ketone.

Following the application of the above-described mixture to the metallic member enclosed optical fiber, the sheathed optical fiber is moved through an apparatus (not shown) which causes the adhesive material to be in a non-tacky solid state. For the polyvinyl butyral mixture, the apparatus causes the mixture to be dried. However, if a hot melt adhesive material were to be applied, then the apparatus may be used to cool the adhesive material. For the preferred embodiment, the drying or apparatus is designed to dry the liquid adhesive mixture on the optical fiber to cause the fiber to be tack-free to allow it to be wound loosely on a takeup.

For polyvinyl butyral, the treating temperature range is about 70° C. to about 120° C. For other suitable materials, the treatment temperature range may be different, but is generally above 70° C. That time or temperature or that desired level of bonding will be based on the properties of the adhesive material used.

After the drying or solidification of the adhesive material on the metallic tubular member 50 has been accomplished, the sheathed optical fiber is wound in a plurality of convolutions on a process spool. The winding on the process spool is accomplished so that the optical fiber is somewhat loosely wound thereon. Typically the tension on the optical fiber as it is wound loosely on the intermediate process spool is about 30 to 40 grams.

Then the spool of loosely wound sheathed optical fiber and another spool which is designated a deployment or carrier bobbin 21 are arranged for a rewind operation. During that operation, the sheathed optical fiber is rewound from a plurality of loosely wound convolutions to a precision wound package comprising a plurality of layers each comprising a plurality of tightly wound convolutions.

Following the rewind operation, the precision wound package of optical fiber is treated to activate the adhesive material and to cause at least portions of adjacent convolutions to bond molecularly to each other. The adhesive material is treated to develop bonds between contiguous portions of the convolutions of the optical fiber.

In another embodiment, the material of the layer 60 may comprise a moisture reactive silicone resin oligomer and a solvent system which includes a non-hygroscopic solvent which may be applied as a spray as the metal enclosed optical fiber is wound on a spool. In the presence of moisture, the material cures. In the process of curing, the silicone resin releases, advantageously, no organic materials which adversely affect the optical fiber coating material or the metallic reinforcing element. In this embodiment, the spray mixture comprises from about 5 to about 50% by weight of a silicone resin solution with 20% being preferred. The silicone resin solution comprises about 80% by weight of a silicone resin block copolymer and about 20% by weight of toluene. A preferred silicone resin solution is one available commercially from the Dow Corning Company under the designation DC 1-2577.

Added to the silicone resin is a solvent system comprising about 50 to about 95% by weight of the mixture. Solvent evaporates and moisture is absorbed into the copolymer resin which begins the process of curing.

The preferred solvent which is added to the silicone resin solution is a non-hygroscopic, aromatic solvent. Although toluene is preferred, xylene, for example, which is chemically similar to toluene, may be used. Aromatic solvents are characterized by their stability; once dried by distillation, they remain dry and will not reabsorb water. On the other hand, a solvent such as methyl ethyl ketone (MEK) is not regarded as stable to water inasmuch as it absorbs water by hydrogen bonding. MEK does, however posses some desirable properties such as its boiling point and vapor pressure. Accordingly, aromatic solvent which have boiling points and vapor pressures similar to those properties of MEK are used. Further, a solvent system which includes a mixture of an aromatic solvent and MEK may be used. In such a mixture, the aromatic solvent, for example, comprises about 60% by weight of MEK and 40% by weight of toluene.

Also, in using a silicone resin, the mixture comprises a catalyst and a wetting agent. Added are about 0.05% by weight of a catalyst such as dibutyltin oxide or dibutlytin dilaurate or dibutlytin diacetate and about 0.1% by weight of a wetting agent such as DC 344 fluid which is available from the Dow Corning Company. The catalyst is effective at temperatures above ambient functions during the heat conditioning cycle to facilitate the curing process and assures completion of that process. The cure rate can be changed by using a higher temperature and by using a catalyst. A normal cure time for an uncatalyzed mixture is in terms of hours. In this embodiment of the invention, the mixture cures in about one hour. The temperature and the catalyst cooperate to assure that the reaction goes to completion and that it will not be in an intermediate cure with a possible change in properties during storage.

The wetting agent of the preferred embodiment causes the adhesive mixture to wet the surface in a desired manner. It causes the material of the layer 60 to have improved flow. The wetting agent is included in a relatively small concentration.

Silicone is a preferred adhesive constituent because of its excellent stability and low temperature properties. Silicone has stable environmental performance including oxidative and hydrolytic stability. Because the silicone which is used is a block copolymer, its mechanical properties when temperature cycled remain within a desired range.

After winding of the sheathed optical fiber in the alternative embodiment in which a silicone based material is sprayed onto the convolutions as they are wound on a bobbin, the packaged optical fiber is heat-conditioned at a temperature of about 71° C. in a chamber (not shown) to relax stresses generated during winding. Most of the solvent evaporation occurs prior to the heat-conditioning, however, some heat-assisted cure does occur in the chamber. The elevated temperature also warms the adhesive material and any polymeric coating materials on the optical fiber to the elastomeric region so that stress relaxation more readily occurs, improving optical performance.

The silicone adhesive material has a modulus which is substantially constant over the operational temperature range. The modulus cannot become too low at elevated temperatures or the wound bobbin may become mechanically unstable. Therefore, between −32° C. and 60° C., the expected deployment temperature range, the adhesive material must stabilize the assembly of the fiber and the reinforcing member while allowing reasonable peel force for successful payout during deployment.

Not all silicone materials are acceptable. The silicone constituent of the adhesive material of the package of this invention includes a low molecular weight oligomer; more specifically, it comprises a methoxy terminated polysiloxane oligomer. Reaction of moisture with the silicone oligomer causes curing during winding and during the subsequent heat conditioning. The oligomer contains block segments which have different glass transition temperatures, $T_g$.

To achieve stability, the silicone constituent of the adhesive material is a block copolymer, as noted, having dual $T_g$ characteristics providing the substantially constant modulus over the operational temperature range. By dual $T_g$ characteristics is meant that the polymeric adhesive material of this invention has a transition from a relatively high modulus to a plateau which spans between the relatively high modulus and a relatively low modulus. There is a defined $T_g$ between the relatively high modulus and the plateau and another $T_g$ between that plateau and the relatively low modulus of the elastomeric region.

The dual $T_g$ is important. Within the plateau between the dual $T_g$ values, the modulus is sufficiently high to provide package stability. This intermediate plateau or region is sufficiently long with respect to temperature and time so that the physical problems associated with payout are overcome. Advantageously, because of its dual $T_g$ characteristics, the adhesive material of the package of this invention can perform well at either end of the environmental temperature spectrum.

Figure 5:
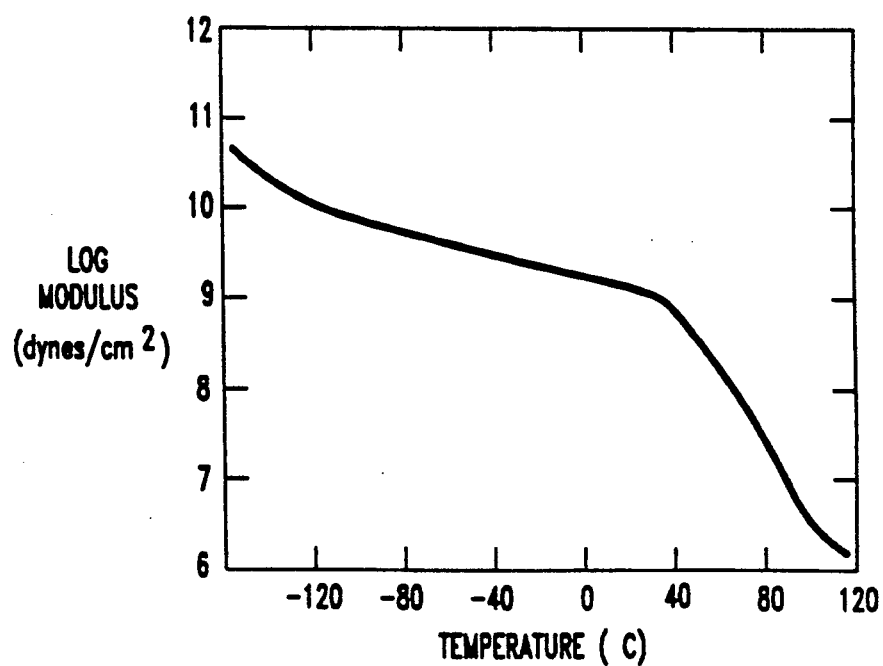
FIG. 5 is a curve which depicts at nominal strain rates a plot of a logarithm of modulus versus temperature of an adhesive material which may be used to provide an outer layer of a sheathed optical fiber.

The adhesive material used for the layer 60 of the sheathed optical fiber 15 should exhibit a modulus curve similar to that shown in FIG. 5 which is different in a significant aspect from that of FIG. 4. The modulus of the block copolymer of the adhesive material of this invention is relatively stable over an operating temperature range of from about −100° C. to about 60° C., remaining at a substantially constant value over a wide range of temperature. As can be seen from FIG. 5, material which may be used for the layer 60 has a modulus variation within a launch window which is about $10^8$ to $10^{9.5}$ dynes/cm$^2$. In other words, the transition between a rigid glassy state and an elastomeric state is less steep and is spread over a wider temperature range. This is advantageous in that it is of help in preserving the optical performance of the optical fiber.

The precision wound package 20 may remain in storage for some time as represented by the higher log time values outside the so-called payout window. However, at payout, the modulus which is exhibited at the peel point again are those values shown in the payout window. This demonstrates that the modulus behavior at the peel point is relatively stable with respect to time.

Figure 6:
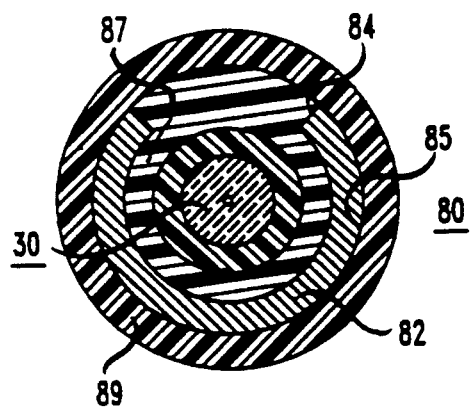
FIGS. 6, 7 and 8 are end sectional views of alternative embodiments of this invention.

In an alternative embodiment such as that shown in FIG. 6 and designated by the numeral 80, the sheathed optical fiber again comprises an elongated metallic member 82. However, in the alternative embodiment, the metallic member 82 is provided with a longitudinally extending slot 84 which opens to a circumferential surface 85 of the metallic member, Should the fiber be disposed in a slot of a metallic member, the metallic member may have two configurations. In one embodiment which is shown in FIG. 6, the metallic member 82 is formed so that the cross sectional configuration exceeds a half circle. As such, free end portions thereof extend about the optical fiber disposed within the slot and function to retain the fiber in the slot.

A void 87 formed between the optical fiber and the metallic member is filled with a suitable material. Such a material may be an extrudable thermoplastic material such as Hytrel polyether polyester plastic material or polyvinyl chloride. Also, suitable are hot melt, ultraviolet curable materials and reactive polyurethanes and silicones. It should be observed from FIG. 6 that the material within the void 87 also fills the slot 84 of the reinforcing metallic member.

For those applications in which the sheathed optical fiber is to be wound on a spool or bobbin, the sheathed optical fiber may be provided with an outer layer 89 of material which provides sufficient tack between adjacent convolutions wound in the spool or bobbin. Such a material of the layer 89 may be the same as those materials discussed for the outer layer 60 in the embodiment of FIG. 3. Should the material of the layer 89 comprise a moisture reactive silicone resin oligomer, the composition may include an adhesion promoter to enhance the adhesion of the optical fiber to a wall of the reinforcing member which defines the slot 84. An acceptable adhesion promoter may comprise one from the silane family.

Figure 7:
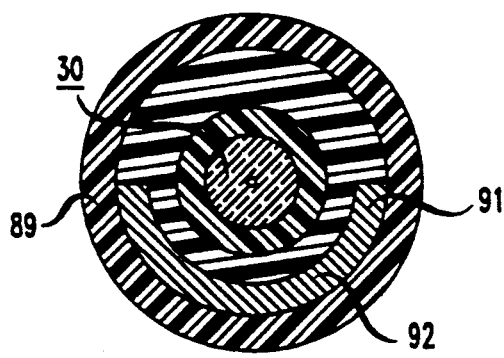

Shown in FIG. 7 is an alternative embodiment of the slotted metallic reinforcing member in which end portions 91—91 of a metallic member 92 do not extend far enough to secure the fiber 30 within the slot. In that embodiment, materials such as those used in FIG. 6 to fill the void between the fiber and the metallic member may be used to secure the fiber within the slot.

Figure 8:
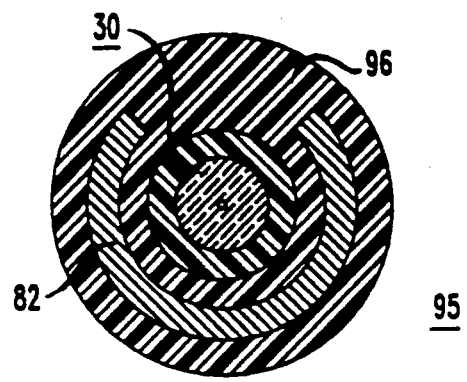

In FIG. 8 is shown still another embodiment, designated 95, of the slotted metallic tube. Instead of using one material to fill the void between the fiber and the metallic member and another material for an external layer, one material 96 is used for both purposes. A suitable material may be a thermoplastic material, amorphous or semi-crystalline, such as those applied in the layer 60 of FIG. 3.

A most critical parameter is the amount of the adhesive material which is applied to hold the optical fiber within the slot. Of course, it is applied to achieve a uniform coverage and hopefully not to protrude from the slot.

The securing material for the embodiment shown in FIG. 6 may be applied by advancing the slotted metallic member with the optical fiber therein through a bath of thermoplastic or hot melt material, for example, and a die at an end of the bath. The die causes the slotted metallic member to be provided with a coating layer of the thermoplastic material. About that portion of the optical fiber whereat the U-shaped metallic member is discontinuous, the securing material fills the slotted opening. As a result, the final product appears as is shown in FIG. 6. The sheathed optical fiber includes a partially encasing metallic member and a layer 89 of thermoplastic material, for example. The material of the layer 89 causes the sheathed optical fiber to have a circular cross section transverse to a longitudinal axis of the fiber.

The external layer 96 in FIG. 8 serves three functions. First, it serves to hold the optical fiber within the slotted metallic member. Secondly, the layer of thermoplastic material causes the optical fiber to be protected by a substantially circular cross section. Thirdly, it causes sufficient tack between adjacent convolutions of the optical fiber when wound on the spool to prevent unintended pull off of the convolutions. This last function is important to prevent unraveling of the convolutions which could impair successful payment once trajectory of a tethered vehicle begins.

A further advantage of the reinforced optical fiber of this invention is the regularity of the transverse cross section of the sheathed optical fiber. As mentioned earlier in the Background of the Invention, the winding of optical fiber on a spool for use in tethered vehicles must be accomplished in a precision manner. Otherwise, payout could be disrupted. If the transverse cross section is uniform, the winding pattern most likely is uniform.

Figure 9:
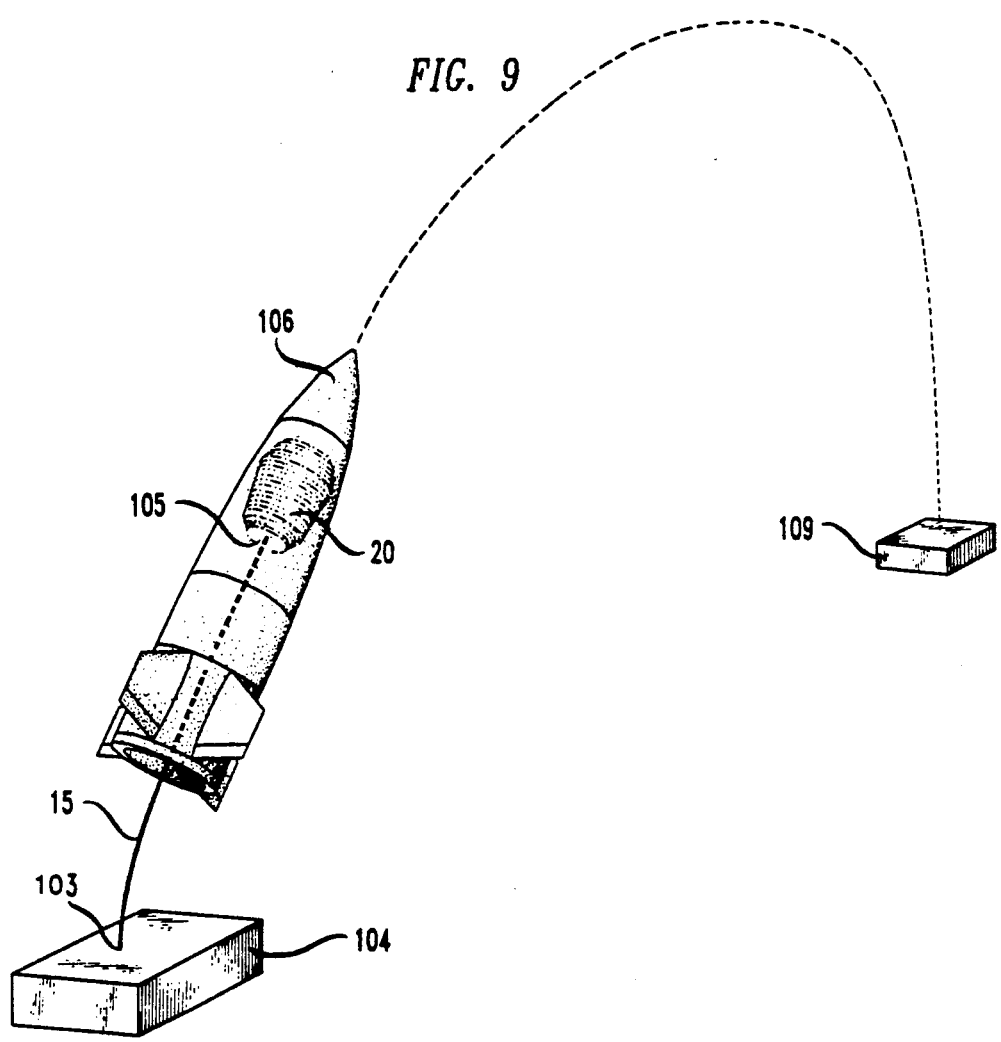
FIGS. 9 and 10 are schematic views of the precision wound bobbin of sheathed optical fiber as used in a tethered vehicle.

As can be seen in FIG. 9, the stable package 20 comprising the bobbin 21 of precision wound optical fiber may be positioned so that the optical fiber is payed off in an axial direction as the bobbin is being propelled in the opposite direction. In one application of the package of this invention, one end 103 of the optical fiber may be connected to a control system 104 and another end 105 to electronic gear within a tethered vehicle 106. The control system 104 is effective to guide the vehicle 104 to a target 109. Of course, it should be understood that the sheathed optical fiber may be wound on a mandrel and the mandrel removed from the package after the winding has been accomplished. With such a package, the sheathed optical fiber may be unwound from the inside toward the outside instead of in the manner shown when the fiber is wound on a bobbin.

Figure 10:
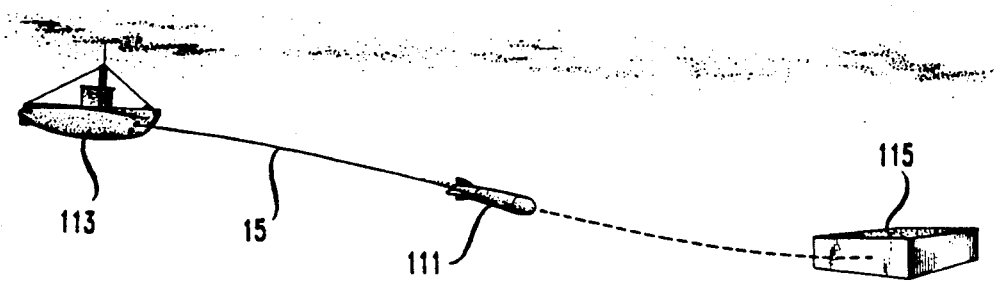

In another environment of use, a package 20 of the sheathed optical fiber is mounted in a torpedo 111 (see FIG. 10) which has been launched from a submarine 113. Sheathed optical fiber 15 extends from the torpedo to the submarine and is used to guide the torpedo to a target 115.

The optical fiber package of this invention overcomes the problems of the prior art. Advantageously, the metallic casing about the fiber protects the fiber and is helpful in obtaining a precision wound package. Also, the metallic casing allows mishap-free deployment and minimally affects optical fiber performance. Furthermore, problems such as the formation of canyons which may occur in the wound package because of differential expansion between the optical fiber and often used metallic bobbins are overcome with the metallic sheathed optical fiber of this invention.

It is to be understood that the above-described arrangements are simply illustrative of the invention. Other arrangements may be devised by those skilled in the art which will embody the principles of the invention and fall within the spirit and scope thereof.

We claim:

1. A sheathed optical fiber, which comprises:
   a length of optical fiber having at least one layer of coating material thereon and having a longitudinal axis; and
   a reinforcing member including a longitudinally extending passageway in which said length of optical fiber is disposed to provide a mechanically rugged sheathed optical fiber in which said optical fiber is secured in said passageway from inadvertent lateral dissociation with said reinforcing member, said passageway having a cross section normal to the longitudinal axis which is larger than the cross section of said optical fiber which is normal to the longitudinal axis and which is such that the optical fiber is decoupled from said reinforcing member to minimize amplitude variations in said fiber from engaging said reinforcing member such that microbending losses in said length of optical fiber are minimized.

2. The sheathed optical fiber of claim 1, wherein a void is formed between said optical fiber and said reinforcing member.

3. The sheathed optical fiber of claim 2, which also includes a layer of a plastic material which is applied to an outer surface of said reinforcing member.

4. The sheathed optical fiber of claim 3, wherein said material which fills said void and said material which comprises said layer applied to the outer surface of said reinforcing member are identical.

5. The sheathed optical fiber of claim 1, wherein said reinforcing member is comprised of metal.

6. The sheathed optical fiber of claim 1, wherein said reinforcing member has a slot formed longitudinally therealong, said coated optical fiber being disposed in said slot.

7. The sheathed optical fiber of claim 6, wherein a void is formed between said optical fiber and said reinforcing member and wherein plastic material fills said void between said optical fiber and said reinforcing member and said slot and said sheathed optical fiber includes a layer of plastic material applied to an outer surface of said reinforcing member and of said plastic material in said slot.

8. The sheathed optical fiber of claim 7, wherein said material which fills said slot and which comprises said layer which is applied to an outer surface of said reinforcing member and of said plastic material in said slot have the same composition.

9. A package of elongated optical transmitting medium from which the elongated optical transmitting medium may be payed out, said package comprising:
   a plurality of convolutions of an elongated reinforced optical transmitting medium which are disposed with adjacent convolutions being in engagement with one another, said reinforced optical transmitting medium comprising:
   a length of optical fiber having at least one layer of coating material thereon and having a longitudinal axis; and
   a metallic reinforcing member including a longitudinally extending passageway in which is disposed said optical fiber to provide a mechanically rugged sheathed optical fiber, said passageway having a cross section normal to the longitudinal axis which is larger than the cross section of the optical fiber which is normal to the longitudinal axis and said optical fiber secured in said passageway from inadvertent lateral disassociation with said reinforcing member and decoupled sufficiently from said reinforcing member such that microbending losses in said length of optical fiber are minimized.

10. The package of claim 9, wherein said metallic reinforcing member includes a tubular metallic member in which said optical fiber is received.

11. The package of claim 10, wherein unintended relative movement between said optical fiber and said metallic reinforcing member is prevented by a material which is disposed in engagement with at least portions of said optical fiber and portions of an inner wall of said tubular metallic member.

12. The package of claim 11, wherein said material which is interposed between said optical fiber and said metallic tubular member is selected from the group consisting of thermoplastic materials, which includes amorphous and semi-crystalline materials, hot melt materials, thermoset materials, ultraviolet energy curable materials, reactive polyurethanes, silicones, oil extended block copolymers and grease-like materials.

13. The package of claim 10 wherein an outer surface of said tubular metallic member is provided with a layer of adhesive material.

14. The package of claim 13, wherein said adhesive material of said outer layer comprises a mixture of a polyvinyl butyral plastic material and a solvent.

15. The package of claim 9, wherein said metallic reinforcing member comprises an elongated metallic member having a longitudinally extending slot which opens to an outer surface thereof with said optical fiber being disposed in said slot.

16. The package of claim 15, wherein the slot of said metallic member is filled with a plastic material for securing said optical fiber with said metallic member.

17. The package of claim 16, wherein said plastic material which fills said slot is selected from the group consisting of thermoplastic materials, which include amorphous and semi-crystalline materials, thermoset materials, hot melt materials, ultraviolet light energy curable materials, reactive polyurethanes, silicones, oil extended block copolymers and grease-like materials.

18. The package of claim 16, wherein said plastic material which fills said slot is a first plastic material and said metallic reinforcing member also includes a layer of a second plastic material which is disposed about said metallic member and the plastic material which fills said slot.

19. The package of claim 18, wherein said first plastic material and said second plastic material have the same composition.

20. The package of claim 18, wherein said second plastic material comprises a mixture of polyvinyl butyral plastic material and a solvent.

* * * * *